United States Patent [19]

Solomon

[11] Patent Number: 5,255,941
[45] Date of Patent: Oct. 26, 1993

[54] ANTIFRAUD CREDIT CARD ASSEMBLY

[76] Inventor: Guillermo S. Solomon, P.O. Box 310, Santiago, Dominican Republic

[21] Appl. No.: 897,836

[22] Filed: Jun. 12, 1992

[51] Int. Cl.⁵ .............................................. B42D 15/00
[52] U.S. Cl. ....................................... 283/82; 283/904
[58] Field of Search ................... 283/82, 904, 901, 83; 235/493, 494, 447, 487

[56] References Cited

U.S. PATENT DOCUMENTS

| | | |
|---|---|---|
| 3,399,473 | 3/1968 | Jaffe . |
| 3,624,938 | 1/1970 | Richard . |
| 3,787,839 | 1/1974 | Fayling . |
| 3,972,138 | 8/1976 | Armbruster et al. ................. 283/82 |
| 4,100,689 | 7/1978 | Broune . |
| 4,432,567 | 2/1984 | Stockburger et al. . |
| 5,166,501 | 11/1992 | Woolley ............................ 283/82 X |

Primary Examiner—Mark Rosenbaum
Assistant Examiner—Willmon Fridie, Jr.
Attorney, Agent, or Firm—Charles E. Baxley

[57] ABSTRACT

An antifraud credit card assembly includes a card member having first and second faces and a magnetic stripe on the first face and bearing information that is presentable to a sensing machine by a person seeking to consummate a transaction. The credit card assembly further has a movable device for mechanically changing the information provided by the magnetic stripe for selectively presenting to the machine any of a plurality of messages including a single legitimate message that allows consummation of the transaction and a plurality of illegitimate messages that deny such consummation. In one example, the movable device is a slide member, and in another example, the movable device is a rotatable disc. The magnetic stripe may be removable.

9 Claims, 3 Drawing Sheets

ANTIFRAUD CREDIT CARD ASSEMBLY

BACKGROUND OF THE INVENTION

This invention relates to an antifraud credit card assembly, and more particularly to such a credit card assembly that is of the utmost simplicity, ease of use and minimum cost, while at the same time being highly effective in preventing misuse of the credit car assembly.

A search hereon has revealed the following U.S. Pat. Nos.:

| Patent No. | Issued | Inventor(s) |
| --- | --- | --- |
| 3,399,473 | September 3, 1968 | Jaffe |
| 3,624,938 | December 7, 1971 | Richard |
| 3,787,839 | January 22, 1974 | Fayling |
| 4,109,689 | July 18, 1978 | Broune |
| 4,432,567 | February 21, 1984 | Stockburger et al. |

Jaffe '473 relates to a combination credit card and is really just an electric switch.

Richard '938 relates to a foolproof credit card and, like Jaffe '473, is really just an electric switch.

Fayling '839 relates to a magnetic viewer device having movable anisotropic elements. It is complicated to manufacture and assemble, bulky and costly, and may not be altogether reliable.

Broune '689 relates to a transaction card, having permanent indicia for designating an authorized user of the card. One or more rotatable discs with coded indicia thereon may be viewed through a window to complete a coded designation of authorized use. The Broune device is easy to make and low in cost, but the code must be previously known to restaurants, hotels, and so forth. Furthermore, Broune is not concerned and does not deal with magnetic stripes.

Stockburger et al. '567 relates to an authorization card with one or more storing zones for storing information defining the extent of authorization, for example credit information in the case of a credit card. The card is complicated to make and use by a card owner.

These prior patents are believed to be irrelevant to the patentability of the present invention.

Important objects of the present invention are to provide an antifraud credit card that is of the utmost simplicity and ease of use and minimum cost while at the same time is highly effective in preventing misuse of the credit card.

The manner in which the invention attains these objects of the invention will become apparent hereinafter.

SUMMARY OF THE INVENTION

An antifraud credit card assembly embodying the invention comprises a card member having first and second faces and a magnetic stripe on the first face and bearing information that is presentable to a sensing machine by a person seeking to consummate a transaction. The credit card assembly further has movable means for mechanically changing the information provided by the magnetic stripe for selectively presenting to the machine any of a plurality of messages including a single legitimate message that allows consummation of the transaction and a plurality of illegitimate messages that deny such consummation. The magnetic stripe may be removable.

In one preferred embodiment of the invention, the movable means include a slide member, and in a second preferred embodiment of the invention, the movable means include a rotatable disc.

DESCRIPTION OF THE INVENTION

Figure 1:
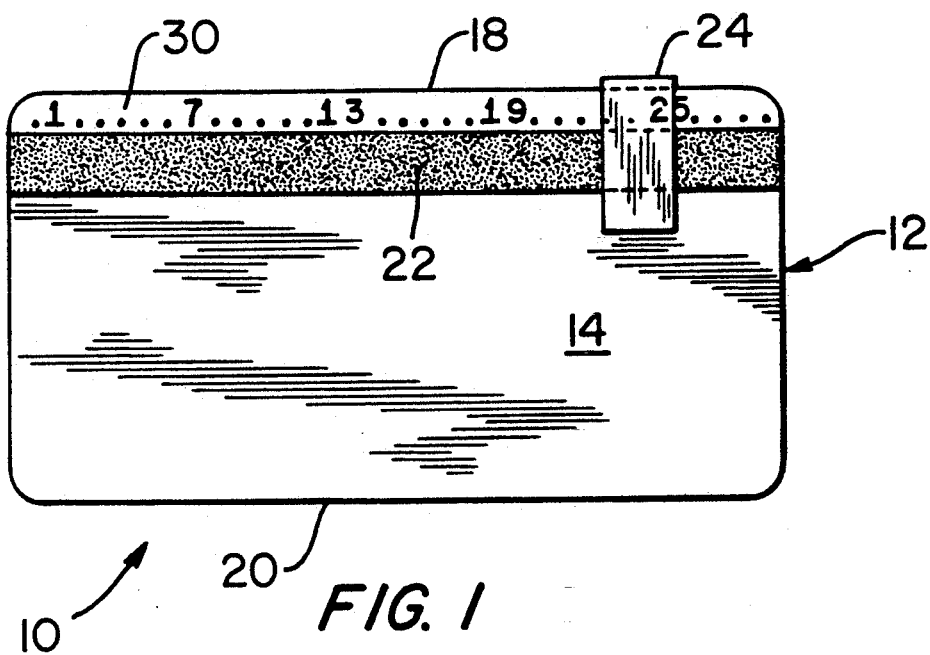
FIG. 1 is an elevation of an antifraud credit card assembly that is a preferred embodiment of the invention.
Figure 2:
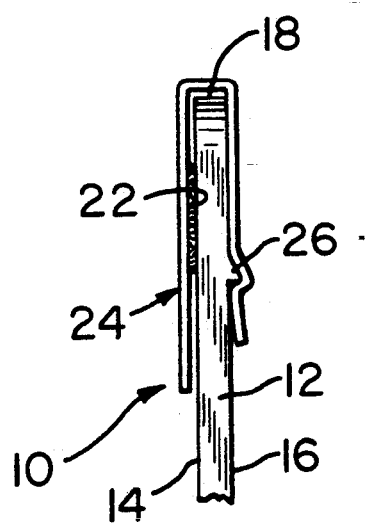
FIG. 2 is a fragmentary end view of the antifraud credit card assembly of FIG. 1.

FIGS. 1 and 2 show an antifraud credit card assembly 10 that is a first preferred embodiment of the invention. Credit card assembly 10 comprises a card member 12 having opposite front and rear faces 14 and 16, respectively, and upper and lower edges 18 and 20, respectively, and a magnetic stripe 22 adhered to front face 14. Magnetic stripe 22 carries a magnetic message.

Credit card assembly 10 further comprises a slide member 24 that is movable along magnetic stripe 22 and covers a limited, constant but movable length of stripe 22. Slide member 24 has a single legitimate position, all other positions being illegitimate.

Upper edge 18 of card member 12 is straight and magnetic stripe 22 is parallel to upper edge 18.

Slide member 24 is generally U-shaped and straddles faces 14 and 16 of card member 12. Card member 12 has a longitudinal projection 26 (FIG. 2) on face 16 and slide member 24 is configured to conform to projection 26 in interengagement therewith, thus to retain slide member 24 in assembled relationship with card member 12. Slide member 24 masks and negates the portion of the magnetic message which is covered by slide member 24, thus providing movable means for changing the magnetic message as slide member 24 is moved therealong.

Slide member 24 can be made of nonmagnetic material or metal and slide member 24 can if desired carry a magnetic stripe of its own.

As seen in FIG. 1, slide member 24 is parallel sided and card member 12 has, on its face 14, a scale 30 to aid an owner of credit card assembly 10 in positioning slide member 24 to enable legitimate use of card assembly 10 but being of no assistance to anyone else. After a legitimate use of card assembly 10, the owner can move slide member 24 off of its position of legitimate use, or slide member 24 can even be moved sufficiently far to be removed from card member 12, if desired.

Figure 3:
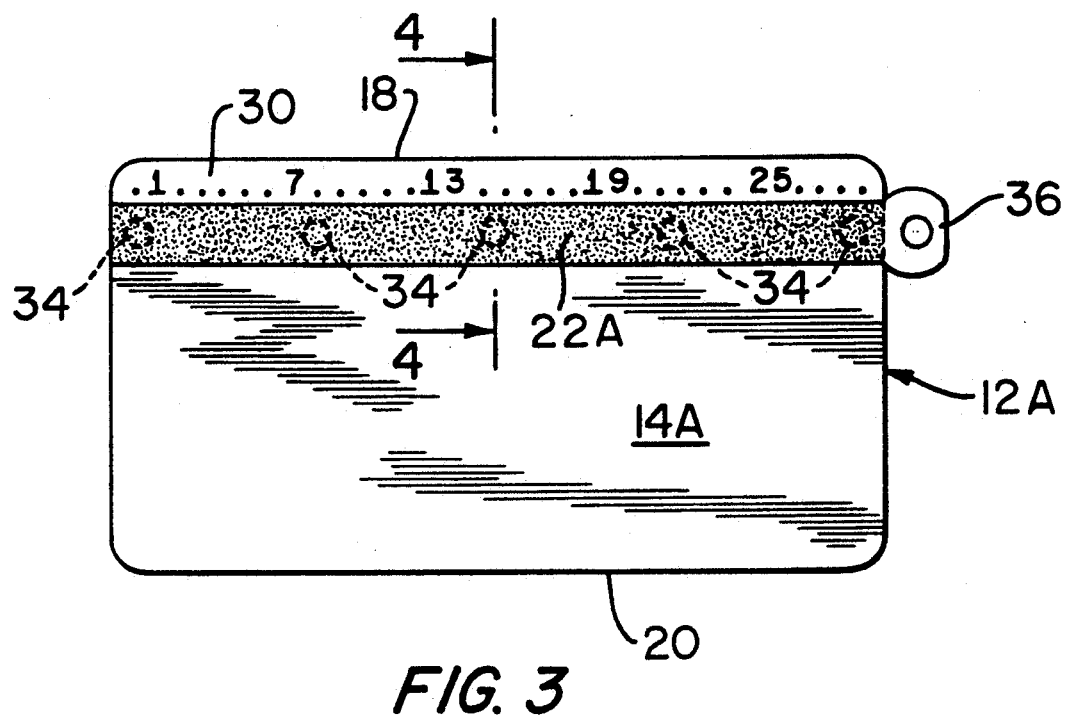
FIG. 3 is a view similar to FIG. 1 but showing a modification of a component of the first preferred embodiment of the invention.
Figure 4:
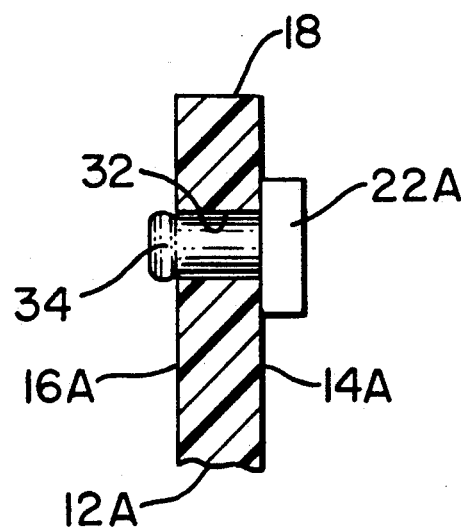
FIG. 4 is a fragmentary view taken on line 4—4 of FIG. 3.

FIGS. 3 and 4 show a card member 12A that is a modification of card member 12, but is interchangeable therewith. Card member 12A is to be used with slide member 24 even though not shown therewith. Card member 12A has opposite faces 14A and 16A that are similar, respectively, to faces 14 and 16 of card member 12. Card member 12A also has upper and lower edges 18 and 20 and scale 30 that are like the same numbered parts of card member 12. FIGS. 3 and 4 also show a magnetic stripe 22A in removable assembly with card member 12A. To that end, card member 12A has a plurality of small holes 32 (five as shown in FIG. 3) that are evenly spaced along a straight line parallel to upper edge 18 and just below scale 30. One hole 32 is shown in FIG. 4 joining faces 14A and 16A. Magnetic stripe 22A has on one face a plurality of projections 34 (see FIG. 4) that are sized, shaped and spaced for snap fit engagement in holes 32 in a one-on-one engagement therewith.

Magnetic stripe 22A has at one end an ear-shaped handle 36, whereby magnetic stripe 22A can be grasped and pulled away from face 14A to remove projection 34 from holes 32, thereby to separate magnetic stripe 22A from card member 12A and allowing removal of magnetic stripe 22A from card member 12A, as a safety feature.

Figure 5:
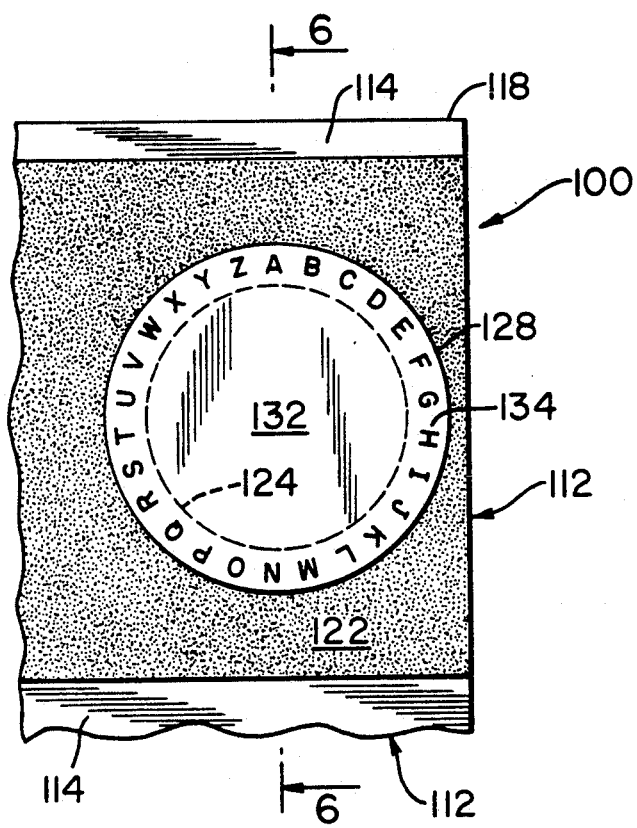
FIG. 5 is a fragmentary elevation of an antifraud credit card assembly that is a second preferred embodiment of the invention.
Figure 6:
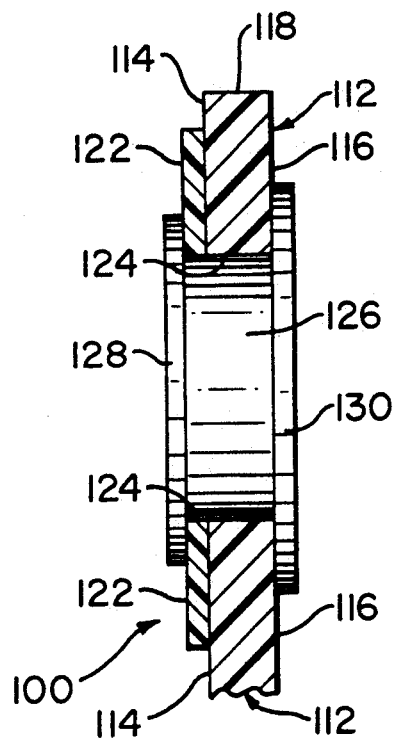
FIG. 6 is a fragmentary view taken on line 6—6 of FIG. 5.

FIGS. 5 and 6 show an antifraud credit card assembly 100 that is a second preferred embodiment of the invention. Assembly 100 comprises a card member 122 having opposite front and rear faces 114 and 116, respectively, an upper edge 118 and a lower edge which is not seen, but which is parallel to upper edge 118. Assembly 100 further comprises a magnetic stripe 122 permanently adhered to face 114 and parallel to upper edge 118 and extending from end to end of card member 112. Near one end of card member 112 and extending therethrough from faces 114 to 116 and also extending through and interrupting magnetic stripe 122 is a cylindrical hole 124 (FIG. 6) of substantial diameter. Hole 124 is occupied by a plastic cylindrical shaft 126 that is fairly snug but rotatable in hole 124. Shaft 126 is bonded to a front disc 128 that overlaps magnetic stripe 122 and is bonded to a plastic rear disc 130 that overlaps rear face 116. Indicia are printed on rear disc 130. Shaft 126, front disc 128 and rear disc 130 are coaxial and together provide a spool that is rotatable with respect to hole 124.

As seen in FIG. 5, front disc 128 has an exposed face 132 with a plurality of indicia 134 thereon, as shown consisting of the letters A-Z therearound.

As noted, front disc 128 overlaps magnetic stripe 122. Front disc 128 itself carries a crucial portion of the message most of which is conveyed by magnetic stripe 122. By rotatably moving front (magnetic) disc 128 (along with shaft 126 and rear disc 130), one can change the magnetic message given by the combination of magnetic stripe 122 and magnetic disc 128. Disc 128 preferably is plastic and carries only a part of magnetic strip 132 that overlaps the main strip, but has nothing printed on it. A single such overall magnetic message is a legitimate message that allows consummation of a transaction. All other such magnetic messages are illegitimate and will deny such consummation. Only the owner of credit card assembly 100 knows the single legitimate disc setting that will permit consummation of the transaction.

Like credit card assembly 10, credit card assembly 100 has movable means for mechanically changing the information provided by a magnetic stripe to a sensing machine for selectively presenting to the machine any of a plurality of messages including a single legitimate message and a plurality of illegitimate messages.

In the case of credit card assembly 10, the movable means include slide member 24 whereas in the case of credit card assembly 100, the movable means include the rotatable assembly of shaft 126, magnetic front disc 128 and plastic rear disc 130.

It is apparent that the invention well attains the stated objects and advantages, among others.

The disclosed details are exemplary only and are not to be taken as limitations on the invention except as those details may be included in the appended claims.

What is claimed is:

1. An antifraud credit card assembly comprising a card member having first and second faces, a magnetic stripe on said first face, said magnetic stripe bearing magnetic information presentable to a sensing machine by a person seeking to consummate a transaction, movable means for changing the information provided by said magnetic stripe for selectively presenting any of a plurality of messages including a single legitimate message that allows consummation of the transaction and a plurality of illegitimate messages that deny such consummation, said magnetic stripe removable from and replaceable on said first face of said card member.

2. An antifraud credit card assembly according to claim 1 wherein said card member has a plurality of holes therethrough and said magnetic stripe has a plurality of projections that are sized and shaped for snap fit engagement in said holes in a one-on-one engagement therewith and wherein said magnetic stripe has a handle at one end to facilitate pulling said magnetic stripe away from said card member.

3. An antifraud credit card assembly comprising a card member having first and second faces, a magnetic stripe on said first face, said magnetic stripe bearing magnetic information presentable to a sensing machine by a person seeking to consummate a transaction, movable means for changing the information provided by said magnetic stripe for selectively presenting any of a plurality of messages including a single legitimate message that allows consummation of the transaction and a plurality of illegitimate messages that deny such consummation, said movable means including a slide member movable along said magnetic stripe and covering a limited length of said stripe and masking and negating a limited but movable portion of said message, said slide member having a single legitimate position, an upper edge of said card member being straight and said magnetic stripe being parallel to said upper edge, said slide member being generally U-shaped and straddling said faces of said card member.

4. An antifraud credit card assembly according to claim 3 wherein said card member has a longitudinal projection on one of its said faces and said slide member is configured to conform to said projection, in interengagement therewith, thus to retain said slide member in assembled relationship with said card member.

5. An antifraud credit card assembly according to claim 4 wherein said slide member masks and annuls the portion of the magnetic message which is covered by said slide member.

6. An antifraud credit card assembly comprising a card member having first and second faces, a magnetic stripe on said first face, said magnetic stripe bearing magnetic information presentable to a sensing machine by a person seeking to consummate a transaction, movable means for changing the information provided by said magnetic stripe for selectively presenting any of a plurality of messages including a single legitimate message that allows consummation of the transaction and a plurality of illegitimate messages that deny such consummation, said movable means including a slide member movable along said magnetic stripe and covering a limited length of said stripe and masking and negating a limited but movable portion of said message, said slide member having a single legitimate position, said slide member being parallel sided and said card member having on one of its said faces a scale to aid an owner of said card in positioning said slide member to enable legitimate use of said card assembly but said scale being of no assistance to anyone else.

7. An antifraud credit card assembly comprising a card member having first and second faces, a magnetic stripe on said first face, said magnetic stripe bearing magnetic information presentable to a sensing machine by a person seeking to consummate a transaction, movable means for changing the information provided by said magnetic stripe for selectively presenting any of a plurality of messages including a single legitimate message that allows consummation of the transaction and a plurality of illegitimate messages that deny such consummation, said movable means including a rotatable magnetic disc interrupting said magnetic stripe, said disc changing the message according to its rotational position, a cylindrical hole extending through said card member from said first face to said second face and also through said magnetic stripe, a cylindrical shaft within said hole and rotatable therein, a front disc overlapping said magnetic stripe and bonded to said shaft and a rear disc overlapping said rear face and bonded to said shaft, said shaft and said discs providing a spool that is rotatable with respect to said hole.

8. An antifraud credit card assembly according to claim 7 wherein said rear disc has an exposed face with a plurality of indicia thereon.

9. An antifraud credit card assembly according to claim 8 wherein said front disc carries a crucial portion of the magnetic message, and one can change the magnetic message given by the combination of said magnetic stripe and said front magnetic disc to provide a single message that permits consummation of a transaction and a plurality of other messages, any one of which will deny such consummation.

* * * * *